3,591,616
ORGANIC COMPLEX FERRIC COMPOUNDS
Rudolf Baldt, Innsbruck, Austria, assignor to Pharmazeutische Fabrik Montavit Gesellschaft mit beschrankter Haftung, Absam, Tirol, Austria
Filed June 28, 1968, Ser. No. 741,016
Claims priority, application Austria, July 4, 1967,
A 6,220/67
Int. Cl. A61k 27/00; C07c 17/18; C07f 15/02
U.S. Cl. 260—439R          6 Claims

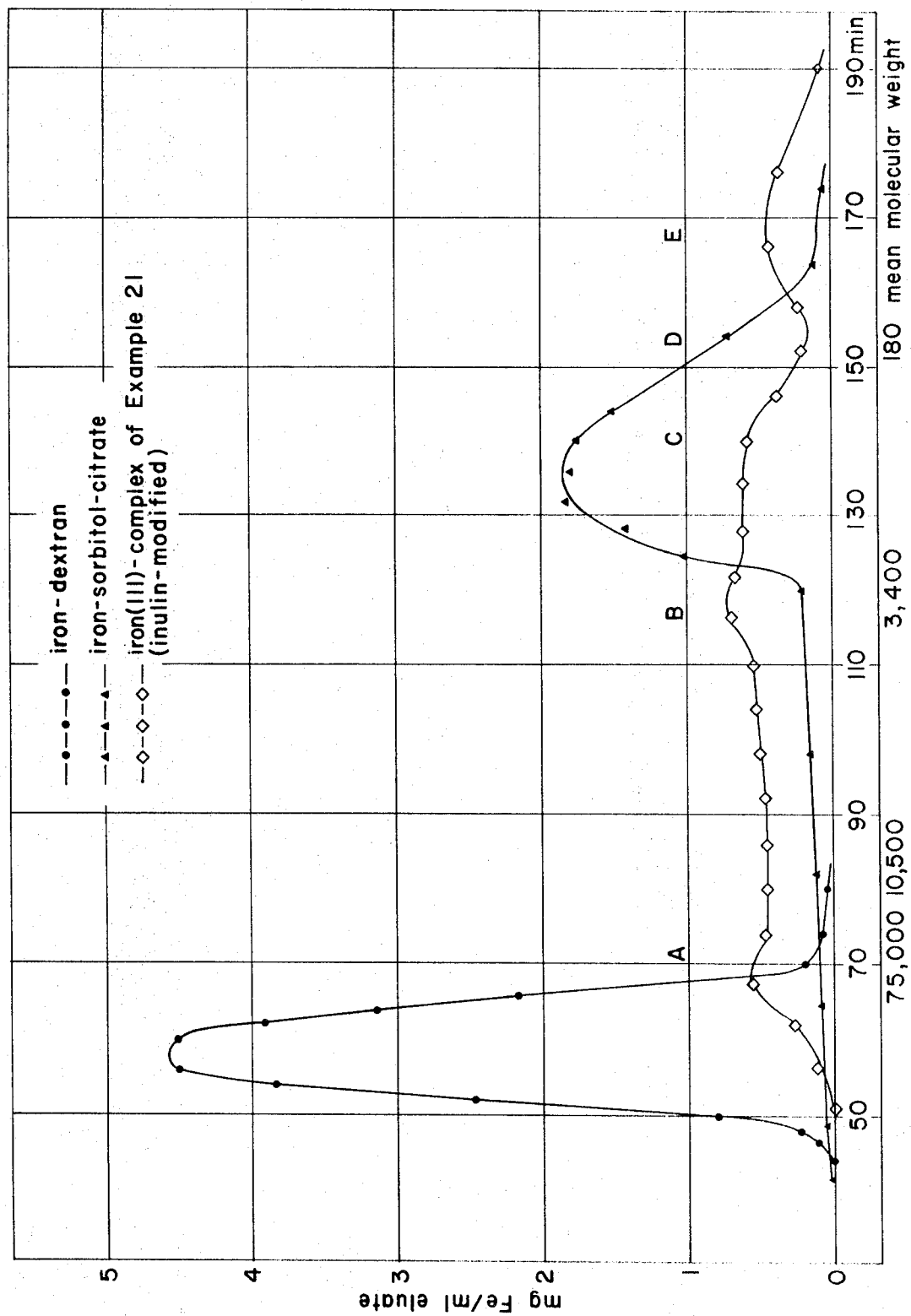

ABSTRACT OF THE DISCLOSURE

The invention relates to iron (III)-glycerin-hydroxycarboxylic acid complexes and inulin-modified variations thereof. Processes for the production of the said complexes are also described.

The iron (III) complexes are indicated for the treatment of iron deficiency anemias.

---

The present invention relates to new organic complex ferric compounds and to a process for their production.

The process of the present invention for the production of organic complex ferric compounds is characterized in that reactants comprising an iron (III) compound, glycerin and a hydroxycarboxylic acid, are mixed in an aqueous medium, and the pH of the reaction mixture is adjusted to a value of at least 5.

The organic complex ferric compounds produced in accordance with the process of the invention are stable in aqueous solution from a weakly acid to a weakly alkaline range and do not require an additional stabilizing agent.

One preferred method of effecting the process of the invention is described below:

An iron (III) compound is dissolved or suspended in water at a temperature between 20° and 100° C., preferably, however, at room temperature (20–30° C.,) and amounts of glycerin and a hydroxycarboxylic acid are added to the resulting solution or suspension so that the mol ratio of the components, i.e. the iron (III) compound to glycerin and to hydroxycarboxylic acid amounts to 1:½–10:⅓–3, preferably, however, 1:½–3:⅓–2. The mixture is subsequently heated to a temperature of 20–100° C., preferably, however, to 50–80° C., and is brought to a pH value of at least 5, preferably, however, 5–8, by the addition of a base. Isolation and purification of the resulting organic iron (III)-complexes may be effected by precipitation with a partially or wholly water-miscible precipitant, decantation of the supernatant liquid, solution of the syrupy or amorphous precipitate in water and repetition of this operation until the desired degree of purity is obtained. It is also possible, however, to use other methods of purification, e.g. liquid-liquid or liquid-solid extraction or dialysis. The iron content of the resulting dry substance may amount to as much as 40% or more.

All inorganic iron (III) compounds which are soluble or suspendible in water, e.g. ferric chloride, nitrate or sulphate, as well as freshly precipitated ferric hydroxide which may optionally have been liberated from foreign ions by washing, are suitable for the reaction of the invention described above. Aside from these inorganic salts it is also possible to use organic iron (III) compounds which are soluble or suspendible in water, e.g. salts of organic hydroxycarboxylic acids; the addition of the latter has the advantage that the iron (III) component and the hydroxycarboxylic acid component are added simultaneously. A further addition of the hydroxycarboxylic acid component may be effected up to the ratio indicated above.

Examples of hydroxycarboxylic acids, which may be used either in their free form or in the form of their iron (III) compounds, are; tartaric acid, citric acid, malic acid and gluconic acid.

The addition of glycerin is indispensable as it is an essential constituent of the iron complex of the invention. Suitable basic compounds for the subsequent adjustment of the pH value are preferably sodium compounds, e.g. sodium hydroxide, sodium carbonate and sodium bicarbonate, although the corresponding potassium or ammonium compounds may likewise be employed. The amount of basic compounds added depends on the type of iron (III) compound used for the reaction and on the amount of hydroxycarboxylic acid. The complex formation already starts at a pH value of 5, whereby ferric hydroxide may temporarily precipitate at a pH value below and around 5, depending on the ratio of the reactants used. The addition of the basic compound may likewise be effected up to pH values over 8, but it has been found that when the neutral point is substantially exceeded undesirable by-products result, which can only be removed with great difficulty during the subsequent purification, whereby lower yields are obtained. The complex formation is therefore preferably effected at pH values up to 8.

Examples of precipitants, partially or wholly water-miscible, which may be used are: methanol, ethanol, isopropanol, acetone and methylethylketone.

The compounds of the invention are intended for medicinal use, and the rate of resorption thereof may need to be controlled. Thus, in cases where a too rapid resorption is not desired, the organic complex ferric compounds may be modified with inulin in order to delay resorption. These organic iron (III)-complex compounds which have been modified with inulin, as well as the process for their production described below, also form part of the present invention.

The process for the production of inulin-modified organic complex ferric compounds is characterized in that reactants comprising an iron (III) compound, glycerin and a hydroxycarboxylic acid, are mixed in an aqueous medium, the pH of the reaction mixture is adjusted to a value of about 5 to 6, natural or depolymerized inulin is added to the reaction mixture, and the pH of the reaction mixture is then adjusted to a value of about 7 to 8.

Apart from the adjustment of the pH values as indicated, the process is identical to that already described. Isolation and purification processes may similarly be identical to those described.

The natural or depolymerized inulin which is added may be in the form of an aqueous solution, at a temperature of 70 to 100° C.

The depolymerized inulin used in accordance with the invention may be obtained by acid depolymerization of natural inulin, e.g. using the process described by Holzer et al. in Monatshefte für Chemie 88, 11–24 (1957). It should be noted, however, that homogeneous depolymerized products can only be obtained when the conditions are always kept constant. A particularly adequate depolymerized inulin is obtained by treating natural inulin at 72° C. with dilute hydrochloric acid for 5 minutes. Before using the depolymerized inulin in accordance with the invention the reducing groups formed during hydrolysis must be oxidized with a suitable oxidizing agent, preferably hydrogen peroxide. A depolymerized inulin having a mean molecular weight of 3000 is preferably used.

A delay in resorption of the organic iron (III)-complex compounds produced in accordance with the invention and a further delay in resorption of the inulin-modified organic iron (III)-complex compounds produced in accordance with the invention, may be attained by adding to the same a resorption retarding agent, e.g. polyvinyl pyrrolidone. Whereas in inulin-modified organic iron (III)-complex compounds the natural or depolymerized inulin added in accoradnce with the invention forms part of the iron (III)-complex, the resorption retarding agent does not form part of the complex, and this may advantageously be added during the production of ampoule solutions. The amount of resorption retarding agent used is such that the ampoule solutions of the same contain at most 15%, preferably, however, 10%.

The production of ampoule solutions for parenteral administration is effected by dissolving the organic iron (III)-complex compounds of the invention (produced by reacting an iron (III) compound, glycerin and a hydroxycarboxylic acid with or without further addition of natural or depolymerized inulin) in water, optionally heating the resulting solutions to a temperature between 40 and 100° C., preferably, however, between 60 and 80° C., adjusting the pH of the solutions to a value of between 5 and 10, preferably between 6 and 8, at the temperature indicated above, by the addition of a hydroxycarboxylic acid, preferably the hydroxycarboxylic acid used for the production of the complex. After the optional addition of a resorption retarding agent, e.g. polyvinyl pyrrolidone, having a mean molecular weight of 25,000, water is added to the solutions until an iron content suitable for therapy of 5 to 100 mg./ml., preferably 50 mg./ml., is obtained, the solutions are poured into ampoules and subsequently sterilized. The preparation of the ampoule solutions may, however, also be effected without isolating the organic or inulin-modified organic iron (III)-complex compounds produced in accordance with the invention. In this case the reaction solutions obtained in accordance with the process of the invention are liberated from undesirable by-products and excess starting materials with a precipitant such as described above. After removing the precipitant, the residue of the last precipitation is diluted with water and these solutions are worked up as described above.

Iron preparations have been employed for many years in the treatment of iron deficiency anaemias, both in veterinary and human medicine. The organic complex ferric compounds, and similarly the inulin-modified variations described, are to be employed in the same manner and at similar dosages. Parenteral administration is a generally suitable mode of administration for injectable iron preparations, and the preparations of the present invention are similarly indicated for parenteral administration. Dosages are dependent on the condition of iron deficiency anaemia being treated, and a controlling factor in this connection is naturally the iron content of the particular preparation.

As already mentioned, and as follows from the process of the invention, the organic complex ferric compounds and their inulin-modified variations are stable in aqueous solution from a weakly acid to a weakly alkaline range. The stability of the compounds is of obvious advantage in that the addition of a stabilizing agent is not required, and the fact that the compounds are stable in a weakly acid to weakly alkaline range renders them suitable for administration. Furthermore, the compounds are stable upon heating of the weakly acid or weakly alkaline solution, a factor necessary for the sterilization of solutions intended for medical use.

Requirements on iron preparations suitable for parenteral administration in the treatment of iron deficiency anaemias, include such factors as low toxicity, resorption and utilization of the provided iron, and a quick elimination of iron not taken up by the body.

The molecular weight distribution curve, which is advantageously obtained by gel filtration, is used for the characterization and identification of the organic or inulin-modified, organic iron (III)-complex compounds obtained in accordance with the invention. The inulin-modified, organic iron (III)-complex compound described in Example 21, as well as the known iron-dextran- and iron-sorbitol-citrate-complexes, have been subjected to a gel filtration and the results obtained are shown in the form of curves in the accompanying drawing. Gel filtration was effected on a Sephadex column having a diameter of 1.5 cm. and a length of 90 cm. Sephadex G–75 was used as gel, which was placed on the column in soaked condition. The height of the gel bed amounted to 80 cm. ±1 cm,. elution was effected with distilled water. 1 ml. of ampoule solution corresponding to 50 mg. of iron was filtered each time. The eluate was collected in periodic fractions, the dropping speed in the unit of time was determined, the fractions converted into ml., the iron content of each fraction was determined and the corresponding values compared with the time. The molecular weight was determined by calibrating the column with dextrans of different, known molecular weights. The dry weights were determined in the eluates. As may be seen in FIG. 1, the curves obtained for the iron (III)-complex of Example 21 modified by inulin greatly differ from the curves of known iron-dextran- and iron-sorbitol-citrate-complexes obtained in analogous manner. The resulting curve, which is characterized by small maxima at A, B–C and E and a minimum at D, is characteristic of the organic iron (III)-complex compound modified by inulin of Example 21 and may be used for its identification.

The following non-limitative examples further illustrate the invention.

EXAMPLE 1

A solution of 1000 g. of ferric chloride hexahydrate, 742.6 g. of glycerin and 355 g. of citric acid in 2000 ml. of distilled water is heated to 55 to 60° C. and 1310 g. of sodium bicarbonate are added portionwise while maintaining the same temperature and while stirring. After the addition is completed 3.4 litres of a clear, dark redbrown coloured solution, having a pH of 7, are obtained. The solution is filtered and 2000 ml. of acetone are added to the filtrate while stirring well. After the syrupy precipitate settles, decantation is effected, the precipitate is dissolved in 2000 ml. of distilled water and 3000 ml. of acetone are added while stirring. Decantation is again effected and dissolving in water, precipitating with acetone and decanting are repeated until an aqueous solution of the precipitate is free of chlorine ions, usually after six precipitations. After the last decantation the adhering acetone is evaporated off in a vacuum or on a water bath and the residue is dried in a drying chamber at 70 to 80° C. An iron-glycerin-citric acid complex is thus obtained, having an iron content of 28% of the dry compound. The pH of an aqueous solution of this complex is about 9.

An injectable solution, containing, for example 50 mg. of iron for every ml. of solution, is produced by dissolving 482.14 g. of the dry complex produced above in 1500 ml. of distilled water, heating to about 60° C. on a water bath and gradually adding a concentrated aqueous solution of 120 g. of citric acid. Heating is effected to 60° C. for a further hour, whereby the pH of the solution is adjusted to 7.15. Distilled water is added to the solution up to a volume of 2700 ml., the solution is filtered through a sterile filter, is placed in ampoules and these are sterilized at 120° C. for 15 minutes, whereby the pH of the solution is only changed slightly to 7.10.

The iron content and pH of the injectable solution may be varied by altering the weighed portions of dry complex and citric acid used for the production of the ampoule solution.

EXAMPLE 2

50 g. of $FeCl_3.6H_2O$, 53.4 g. of glycerin and 17.75 g. of citric acid are dissolved in 200 ml. of water and 45 g. of anhydrous soda are slowly added in small portions at room temperature (about 20° C.) while stirring well. After the addition is completed, the mixture is stirred for a further hour and the solution is filtered with a small amount of filtering aid. A clear, dark red-brown coloured solution, having a pH of 6.8, is obtained as filtrate.

400 ml. of isopropanol are added to this solution while stirring. After the syrupy precipitate settles, decantation is effected, the precipitate is dissolved in 200 ml. of water, is again precipitated with 300 ml. of isopropanol and decanted and this purification is continued until the solution is free from chlorine (5 to 6 precipitations). Precipitation is then again effected with isopropanol, decantation and drying at 80° C. are effected. A dry iron complex, having an iron content of 27%, is thus obtained.

EXAMPLE 3

50 g. of ferric chloride hexahydrate, 53.4 g. of glycerin and 11.83 g. of citric acid are dissolved in 50 ml. of water while heating to 100° C. The solution is kept at this temperature and a concentrated solution of 30 g. of sodium hydroxide in water is added while stirring. After the addition is completed, the solution is filtered whilst hot with a small amount of filtering aid, whereby 230 ml. of a clear, red-brown filtrate, having a pH of 10, are obtained. 500 ml. of 96% ethanol are added to this filtrate while stirring whereby an amorphous precipitate results. The reaction mixture is centrifuged, the aqueous-alcoholic liquid is removed, the precipitate is dissolved in 100 ml. of water, precipitation is again effected with 500 ml. of ethanol and this process is repeated until the solution is free from chlorine. The chlorine-free precipitate is subsequently dried in a vacuum at 40° C., whereby a dry complex, having an iron content of 40%, is obtained.

EXAMPLE 4

Ferric chloride hexahydrate, glycerin and citric acid are dissolved in distilled water at a mol ratio of 1:1:½, the solution is heated to 60° C. on a water bath and sodium bicarbonate is gradually added until the pH of the solution amounts to 6.9. The solution is heated to 60° C. for a further hour, is filtered and the excess reaction products and impurities are removed by repeated precipitation with acetone and dissolving in water. Once the solution is free from chlorine ions, it is dried with spraying whereby the dry iron complex, having an iron content of 32%, is obtained in the form of a fine powder.

EXAMPLE 5

An aqueous solution of ferric chloride, glycerin and citric acid at a mol ratio of 1:10:⅓ is heated to 60° C. on a water bath, is neutralized with sodium bicarbonate up to a pH of 8.1 and the resulting complex is purified by repeated precipitation with isopropanol. The dry compound contains 23.5% of iron.

EXAMPLE 6

An intensely green solution is obtained from ferric chloride, glycerin and citric acid at a mol ratio of 1:1:3, by treating the reaction mixture in a manner analogous to that described in Example 5. The corresponding complex is obtained without the formation of an iron hydroxide precipitate as intermediate. Upon heating the solution on a water bath for a further hour it turns light brown coloured, and after the usual purification with isopropanol and drying, a complex containing only 8% of iron is obtained.

EXAMPLE 7

A solution of 50 g. of $FeCl_3.6H_2O$, 17.8 g. of glycerin and 35.5 g. of citric acid in 100 ml. of water is heated to 40° C. and a total of 77 g. of $NaHCO_3$ is gradually added, whereby the pH of the solution is adjusted to 6.6. An iron complex is formed without an iron hydroxide precipitate as intermediate. After the reaction is completed the solution is filtered, is purified by precipitating with acetone and is dried at 60° C. Iron content 18%.

EXAMPLE 8

50 g. of ferric chloride hexahydrate, 17.8 g. of glycerin and 72.8 g. of a 50% gluconic acid solution are dissolved in 200 ml. of water and 70 g. of $NaHCO_3$ are added at 40° C. The iron complex is formed without an iron hydroxide precipitate as intermediate; the pH of the solution amounts to 6.8. Purification is effected by repeated precipitation with acetone. The amorphous precipitate is finally filtered and dried at 45° C. whereby the corresponding iron complex, having an iron content of 19.6%, is obtained.

EXAMPLE 9

77 g. of $NaHCO_3$ are added to a solution of 50 g. of ferric chloride hexahydrate, 17.8 g. of glycerin and 24.8 g. of d,l-malic acid in 200 ml. of water at room temperature. The pH value of the solution then amounts to 5.2. The solution is purified by precipitating with acetone and is dried in a vacuum without heating, whereby an iron complex, having an iron content of 21.8%, is obtained.

EXAMPLE 10

50 g. of ferric chloride hexahydrate, 17.8 g. of glycerin and 13.9 g. of tartaric acid are dissolved in 200 ml. of water, the solution is heated to 80° C. on a water bath, 77 g. of $NaHCO_3$ are added and after heating to 80° C. for a further hour filtration is effected. Purification is effected by precipitating with acetone and drying is effected at 60° C., whereby a complex, having an iron content of 19.4%, is obtained.

EXAMPLE 11

74.4 g. of $Fe(NO_3)_3.9H_2O$, 89.0 g. of glycerin and 17.8 g. of citric acid are disolved in 200 ml. of water and the temperature is adjusted to 10° C., if necessary with cooling $NaHCO_3$ is then added to the solution, whereby $Fe(OH)_3$ initially precipitates, but dissolves again after the further addition of $NaHCO_3$. After the addition of a total of 61 g. of $NaHCO_3$ the solution has a pH of 6.0. The solution is centrifuged for the purpose of removing undissolved portions, is purified by repeated precipitation with acetone and is dried at 60° C. A complex, having an iron content of 18.7%, is thus obtained.

EXAMPLE 12

25 g. of ferric citrate and 8.2 g. of glycerin are dissolved in 200 ml. of water and a solution of caustic soda is added at room temperature while stirring well until the pH of the solution amounts to 10. The excess reaction material is removed by precipitating with isopropanol, and drying is effected, whereby a complex, having an iron content of 36.8%, is obtained.

EXAMPLE 13

100 g. of ferric chloride hexahydrate are dissolved in 1000 ml. of water and the solution is neutralized with $NaHCO_3$. The precipitated ferric hydroxide is washed with water by decanting several times until the wash water is free from chlorine ions and the major portion of adhering water is removed by centrifuging. The still moist precipitate of purified ferric hydrate is mixed with 200 ml. of water by stirring. 35.6 g. of glycerin and 35.5 g. of citric acid are dissolved in this suspension, the reaction mixture is heated to 80° C. on a water bath and 61 g. of $NaHCO_3$ are added, whereby the iron hydroxide dissolves with the formation of a complex; the solution then has a pH of 8.6. After heating on a water bath for a further hour the solution is filtered, is purified by precipitating with isopropanol and is dried, whereby a complex, having an iron content of 27.4%, is obtained.

EXAMPLE 14

482.1 g. of the iron complex produced in accordance with Example 1 are dissolved in 1500 ml. of water and the pH is adjusted to the desired value as indicated in Example 1. 405 g. of polyvinyl pyrrolidone (of medium molecular weight 25,000) are subsequently dissolved in this solution, water is added up to a volume of 2700 ml., the solution is filtered, is placed in ampoules and these are sterilized in one of the usual manners. This solution contains 50 mg. of iron for every ml. of solution and 15% of polyvinyl pyrrolidone.

EXAMPLE 15

The iron complex produced in accordance with Example 2 is used as such, without conversion into a dry material, for the production of an ampoule solution by removing the adhering isopropanol on a water bath after the last precipitation with isopropanol. The iron content of the syrupy residue is determined and this residue is diluted with water to a concentration of about 70 to 80 mg. of iron for every ml. of solution. Heating is subsequently effected to 60° C. on a water bath, the pH of the solution is adjusted to the desired value with citric acid as indicated in Example 1, water is subsequently added up to a concentration of 50 mg. for every ml. of solution, filtration is effected, the solution is placed in ampoules and these are sterilized.

EXAMPLE 16

1000 g. of $FeCl_3.6H_2O$, 594 g. of glycerin and 284 g. of citric acid are dissolved in 1800 ml. of water and 550 g. of $NaHCO_3$ are added portionwise, whereby the iron hydroxide precipitates and the reaction mixture turns into a thick mash. 226 g. of depolymerized inulin having the composition $(C_6H_{10}O_5)_{15-18}$ and a mean molecular weight of 3000 are dissolved in 500 ml. of water, the solution is heated to the boil, 4 ml. of 30% $H_2O_2$ are added to oxidize free carbonyl radicals, boiling is effected for exactly 5 minutes and the solution is then immediately poured whilst hot into the iron hydroxide mash. The mixture is then placed on a water bath and a further 650 g. of $NaHCO_3$ are added whereby the $Fe(OH)_3$ dissolves with the formation of a complex. After heating on a water bath for 2 hours the pH of the solution is 7.1. The solution is filtered with a small amount of filtering aid and is poured whilst hot into 4000 ml. of acetone while stirring well. After a deposit is formed, the lower phase is mixed with 2000 ml. of water and precipitation is effected by the addition of 3000 ml. of isopropanol while stirring well. Dissolving in 2000 ml. of water and precipitating with 3000 ml. of isopropanol are repeated until all the chlorine ions have been removed. The complex is subsequently dried at 60° C. The complex has an iron content of 32%.

EXAMPLE 17

An ampoule solution containing 50 mg. of iron for every ml. of solution, is produced by dissolving 155.8 g. of the complex obtained in Example 16 in 500 ml. of water, adjusting the pH of the solution to the desired value by the addition of citric acid as described in Example 1, adding water up to a volume of 1000 ml. filtering, placing in ampoules and sterilizing the same.

EXAMPLE 18

The ampoule solution of Example 17 additionally will contain 10% of polyvinyl pyrrolidone when 100 g. of polyvinyl pyrrolidone of a mean molecular weight of 25,000 are dissolved in such ampoule solution. The polyvinyl pyrrolidone is preferably dissolved in the solution before adding water up to the final volume.

EXAMPLE 19

A complex, having an iron content of 38.5% is obtained by effecting the reaction in accordance with Example 16, except that the following weighed portions are used: 1000 g. of $FeCl_3.6H_2O$, 446 g. of glycerin, 213 g. of citric acid, 452 g. of depolymerized inulin having a mean molecular weight of 3000 and 4 ml. of $H_2O_2$.

EXAMPLE 20

226 g. of natural inulin are dissolved in 1000 ml. of hot water and this solution is added to a ferric hydroxide slurry produced by adding 550 g. of $NaHCO_3$ to a solution of 1000 g. of $FeCl_3 \cdot 6H_2O$, 594 g. of glycerin and 284 g. of citric acid in 1800 ml. of water. A further 650 g. of $NaHCO_3$ are subsequently added and the process is continued as indicated in Example 16. The dry complex which is finally obtained contains 25.9% of iron.

EXAMPLE 21

1000 g. of ferric chloride hexahydrate, 446 g. of glycerin and 213 g. of citric acid are dissolved in 1600 ml. of distilled water and 434 g. of $NaHCO_3$ are added portionwise, whereby the iron hydroxide precipitates and the reaction mixture turns into a thick mash. 469 g. of depolymerized inulin are dissolved in 1400 ml. of boiling water and the free carbonyl radicals are oxidized by adding 8 ml. of 30% $H_2O_2$, boiling is effected for exactly 5 minutes and the solution is then immediately poured, whilst hot, into the iron hydroxide mash. A further 710 g. of $NaHCO_3$ are added portionwise to the mixture without further heating and while stirring occasionally, whereby the iron hydroxide partially dissolves. After all the $NaHCO_3$ has been added, the reaction mixture is heated to 78° C. (water bath) and is kept at this temperature for 2 hours while stirring occasionally. The solution is filtered with a small amount of filtering aid and is poured whilst hot into 4000 ml. of acetone while stirring well. After the precipitate settles, decantation is effected and the precipitate is mixed with 2000 ml. of water, and precipitation is effected by the addition of 4000 ml. of isopropanol while stirring well. Solution in 1000–2000 ml. of water and precipitation with 2500–4000 ml. of isopropanol are repeated until all the chlorine ions have been removed. The complex is subsequently dried at 60° C. The iron content amounts to about 37%.

The depolymerized inulin used for the above process is produced as follows:

1000 g. of purest, pyrogen-free inulin are dissolved in 2000 ml. of boiling, demineralized water in an acid-resistant vessel, and the clear solution is cooled to 72° C. ±½° while stirring. As soon as the temperature is adjusted, 160 ml. of dilute hydrochloric acid (produced by diluting 8 ml. of fuming hydrochloric acid up to 1000 ml.) which have also been heated to 72° C. are added while stirring. Hydrolysis is effected while stirring and maintaining the same temperature for 5 minutes, and is then discontinued by pouring into the solution 160 ml. of dilute caustic soda solution, produced by dissolving 4 g. of sodium hydroxide p.a. in 1000 ml. of water. The hot reaction mixture is poured into 4600 ml. of ethanol while stirring vigorously. The mixture is allowed to stand for 24 hours in a closed vessel, is subsequently sucked off or centrifuged and is washed thrice with ethanol. The low sugars are removed completely by dissolving the alcohol-moist substance in 1400 ml. of boiling water, pouring the solution into 4200 ml. of ethanol while stirring well, allowing to stand for a further 24 hours, filtering with suction, again washing thrice with ethanol and drying at 50° C.

What is claimed is:
1. A process for the production of organic complex ferric compounds suitable for the treatment of iron deficiency anemia comprising admixing in an aqueous medium an iron (III) compound, glycerin and a hydroxycarboxylic acid, adjusting the pH of the mixture to a value of at least 5 by the addition of base, the mol ratio of the iron (III) compound:glycerin:hydroxycarboxyclic acid being 1:½–3:⅓–2 and recovering the resulting iron complex.

2. A process of claim 1 wherein the pH of the mixture is adjusted to a value of from 5 to 8.

3. A process of claim 2 wherein the iron (III) compound is selected from ferric chloride, ferric sulphate, ferric citrate or an iron (III) hydroxycarboxylic acid salt.

4. A process of claim 2 wherein the hydroxycarboxylic acid is present as an iron (III) salt.

5. A process of claim 3 wherein the hydroxycarboxylic acid is selected from tartaric acid, citric acid, malic acid and gluconic acid.

6. An iron (III)-glycerin-hydroxycarboxylic acid complex prepared in accordance with claim 1.

References Cited

UNITED STATES PATENTS

| | | | |
|---|---|---|---|
| 2,466,445 | 4/1949 | Landau | 260—438 |
| 3,200,136 | 8/1965 | Grossmith | 260—439 |

OTHER REFERENCES

Bayer et al.: TAPPI, vol. 47, 1965, pp. 557–561.
Enerback et al.: Chem. Abst., vol. 63, 1965, col. 8931.

TOBIAS E. LEVOW, Primary Examiner

A. P. DEMERS, Assistant Examiner

U.S. Cl. X.R.

260—209, 233.3, 999; 424—176, 180, 195, 295